United States Patent
Ki et al.

(10) Patent No.: US 12,034,793 B2
(45) Date of Patent: Jul. 9, 2024

(54) RETRIEVING OPERATIONAL COMMAND RESPONSE TEXT FROM NETWORK DEVICES

(71) Applicant: Juniper Networks, Inc., Sunnyvale, CA (US)

(72) Inventors: Byeongseob Ki, Warren, NJ (US); Shivaprasad Gali, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 33 days.

(21) Appl. No.: 17/215,940

(22) Filed: Mar. 29, 2021

(65) Prior Publication Data

US 2022/0094766 A1    Mar. 24, 2022

(30) Foreign Application Priority Data

Sep. 24, 2020   (IN) .............................. 202041041555

(51) Int. Cl.
| | |
|---|---|
| *H04L 67/01* | (2022.01) |
| *H04L 12/40* | (2006.01) |
| *H04L 67/02* | (2022.01) |
| *H04L 67/63* | (2022.01) |

(52) U.S. Cl.
CPC ........ *H04L 67/01* (2022.05); *H04L 12/40013* (2013.01); *H04L 67/02* (2013.01); *H04L 67/63* (2022.05)

(58) Field of Classification Search
CPC ....... H04L 67/02; H04L 67/327; H04L 67/01; H04L 67/63; H04L 12/40013
See application file for complete search history.

(56) References Cited

U.S. PATENT DOCUMENTS 5,572,674 A * 11/1996 Ernst ....................... H04L 43/00
709/221
7,516,393 B2 * 4/2009 Hepner ............... H03M 13/091
714/776

(Continued)

OTHER PUBLICATIONS

Wikipedia, "Advanced Message Queuing Protocol," 2016. (Year: 2016).*

(Continued)

*Primary Examiner* — Andrew C Georgandellis
(74) *Attorney, Agent, or Firm* — Shumaker & Sieffert, P.A.

(57) ABSTRACT

In general, techniques are described for retrieving operational command response text from network devices. A collector network device comprising an interface and a processor may be configured to perform the techniques. The interface may receive, via a messaging bus between the network management system and a webserver, a first command to request management data stored by a managed network device, and send, in response to the first command, a second command to direct the managed network device to output the management data. The interface may also receive, from the managed network device, the management data. The processor may generate, from the management data, a plurality of partial responses that each includes a portion of the management data, where the interface may next send, via the messaging bus and to the webserver, each of the plurality of partial responses as a separate message.

8 Claims, 5 Drawing Sheets

(56) References Cited

U.S. PATENT DOCUMENTS

| | | | | |
|---|---|---|---|---|
| 7,694,007 | B1* | 4/2010 | Dubrovsky | G06F 9/505 |
| | | | | 709/233 |
| 7,853,676 | B1* | 12/2010 | Freskos | H04L 41/0869 |
| | | | | 709/201 |
| 9,195,518 | B1* | 11/2015 | Larsen | H04L 63/10 |
| 2015/0180920 | A1* | 6/2015 | Hunter | H04L 67/025 |
| | | | | 709/203 |
| 2018/0287954 | A1* | 10/2018 | Dinan | H04L 47/6265 |
| 2018/0375828 | A1* | 12/2018 | Rawat | H04L 12/4633 |
| 2019/0095505 | A1* | 3/2019 | Young | G06Q 10/0833 |

OTHER PUBLICATIONS

Faisal Masood, "Red Hat AMQ," Aug. 30, 2018. (Year: 2018).*
Raphael Cohn, "A Comparison of AMQP and MQTT," 2012. (Year: 2012).*
"MQTT V3.1 Protocol Specification," Oct. 7, 2019. (Year: 2019).*

* cited by examiner

RETRIEVING OPERATIONAL COMMAND RESPONSE TEXT FROM NETWORK DEVICES

This application claims priority to Indian Provisional Patent Application No. 202041041555, filed Sep. 24, 2020, the entire contents of which are hereby incorporated by reference as if set forth in its entirety.

TECHNICAL FIELD

The invention relates to computer networks and, more particularly, to techniques for configuring and managing network devices.

BACKGROUND

A conventional network device, such as a router, typically includes a mechanism, such as a management interface, to locally or remotely configure the device. By interacting with the management interface, various clients, such as human users and automated scripts, can perform configuration tasks. For example, the clients may configure interface cards of the device, adjust parameters for supported network protocols, specify physical components within the device, modify routing information maintained by a router, access software modules and other resources residing on the device, and perform other configuration tasks.

A network management system (NMS) or other controller system may interface with the management interface to facilitate remote configuration or querying of the network device. The NMS may present an interface (often by way of an Internet portal or website) by which an administrator or other network operator may configure or query network devices under management by or otherwise associated with the NMS. In some instances, certain queries entered by the administrator may result in large amounts of management data (e.g., configuration data, status data, etc.) being returned to the NMS for presentation via the Internet portal to the administrator. The managed network device may return the management data responsive to the queries via a stream configured between the NMS and the managed network device. In certain NMS architectures, such large amounts of data may result in inefficiencies.

SUMMARY

In general, techniques are described that enable more effective retrieval of management data. The techniques may be useful for network management commands and/or queries that may retrieve more management data than may be supported via the underlying streaming network architecture and communication architectures of distributed network management system. A distributed network management system may present a frontend webserver to provide the user interface by which a network administrator may interface with the distributed network management system and a backend collector network device that facilitates collection of the management data. The streaming network architecture exists between the webserver and a client device operated by the network administrator, while the communication architecture exists between the collector network device and the webserver.

In these instances in which the underlying streaming network architecture and communication architecture is unable to accommodate streaming of large amounts of management data, the collector network device may divide the management data into discrete chunks, labeling each of the chunks with a transaction identifier and a chunk identifier. The collector network device may then output each chunk separately via the messaging bus configured between the collector network device and the webserver, where the client device may use the transaction identifier and the chunk identifier from each chunk to reconstruct the management data.

In this respect, the collector network device may avoid overwhelming the underlying streaming connection, and thereby potentially prevent time outs, repeated retry requests (as the management data may not be successfully delivered in full in which case the distributed network management system may issue the command again—which is referred to herein as a retry request), and the like. That is, by sending the management data as discrete chunks, the configured messaging bus between the webserver and the collector network device may successfully deliver each chunk, while the streaming connection between the webserver and the client device may also successfully deliver each chunk and not become overwhelmed with the large amount of management data. Moreover, the client device can individually process each successive chunk and update the interface (e.g., the above noted Internet portal or website) with the management data extracted from each chunk, thereby presenting a more responsive interface that allows the administrator or other user to remain more engaged with the Internet portal (which reduces frustration that may result from repeated retry requests when activity between the distributed network management system and the managed network device is not transparent).

In one example, various aspects of the techniques are directed to a method comprising: receiving, by a collector network device and via a messaging bus configured between a webserver and the collector network device, a first command to request management data stored by a managed network device; sending, by the collector network device in response to the first command, a second command to direct the managed network device to output the management data; receiving, by the collector network device and from the managed network device, the management data; generate, by the collector network device and from the management data, a plurality of partial responses that each includes a different portion of the management data; and sending, by the collector network device and via the messaging bus to the webserver, each of the plurality of partial responses as a separate message.

In another example, various aspects of the techniques are directed to a collector network device comprising: an interface configured to: receive, via a messaging bus between the network management system and a webserver, a first command to request management data stored by a managed network device; send, in response to the first command, a second command to direct the managed network device to output the management data; receive, from the managed network device, the management data; and one or more processors configured to generate, from the management data, a plurality of partial responses that each includes a portion of the management data, wherein the interface is further configured to send, via the messaging bus and to the webserver, each of the plurality of partial responses as a separate message.

In another example, various aspects of the techniques are directed to a computing system comprising: a webserver configured to issue, via a message bus between a collector network device and the web server, a first command to request management data stored by a managed network device; and the collector network device configured to: receive, via the messaging bus, the first command; send, in response to the first command, a second command to direct the managed network device to output the management data; receive, from the managed network device, the management data; and generate, from the management data, a plurality of partial responses that each includes a portion of the management data; and send, via the messaging bus and to the webserver, each of the plurality of partial responses as a separate message, and wherein the webserver is further configured to: receive, via the message bus and responsive to issuing the command, the plurality of partial responses from the collector network device, wherein each of the plurality of partial responses is received as a separate message from the collector network device and includes a different portion of the management data requested by the command; and send, to a client device and via a streaming connection between the webserver and the client device, each of the different portions of the management data for presentation at the client device.

In another example, various aspects of the techniques are directed to a non-transitory computer-readable storage medium having instructions stored thereon that, when executed, cause one or more processors to: receive, via a messaging bus between a collector network device and a webserver, a first command to request management data stored by a managed network device; send, in response to the first command, a second command to direct the managed network device to output the management data; receive, from the managed network device, the management data; generate, from the management data, a plurality of partial responses that each includes a portion of the management data; and send, via the messaging bus and to the webserver, each of the plurality of partial responses as a separate message.

In one example, various aspects of the techniques are directed to a method comprising: issuing, by a webserver, to a collector network device and via a message bus configured between the webserver and the collector network device, a command to request management data stored by a managed network device; receiving, by the webserver, from the collector network device via the message bus, and responsive to issuing the command, a plurality of partial responses from the collector network device, wherein each of the plurality of partial responses is received as a separate message from the collector network device and includes a different portion of the management data requested by the command; and sending, by the webserver, to a client device, and via a streaming connection between the webserver and the client device, each of the different portions of the management data for presentation at the client device.

In another example, various aspects of the techniques are directed to a webserver comprising: one or more processors configured to: issue, via a message bus between a collector network device and the webserver, a command to request management data stored by a managed network device; receive, via the message bus and responsive to issuing the command, a plurality of partial responses from the collector network device, wherein each of the plurality of partial responses is received as a separate message from the collector network device and includes a different portion of the management data requested by the command; and send, to a client device and via a streaming connection between the webserver and the client device, each of the different portions of the management data for presentation at the client device; and a memory configured to store the different portions of the management data.

In another example, various aspects of the techniques are directed to a non-transitory computer-readable storage medium having instructions stored thereon that, when executed, cause one or more processors of a webserver to: issue, via a message bus between a collector network device and the webserver, a command to request management data stored by a managed network device; receive, via the message bus and responsive to issuing the command, a plurality of partial responses from the collector network device, wherein each of the plurality of partial responses is received as a separate message from the collector network device and includes a different portion of the management data requested by the command; and send, to a client device and via a streaming connection between the webserver and the client device, each of the different portions of the management data for presentation at the client device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
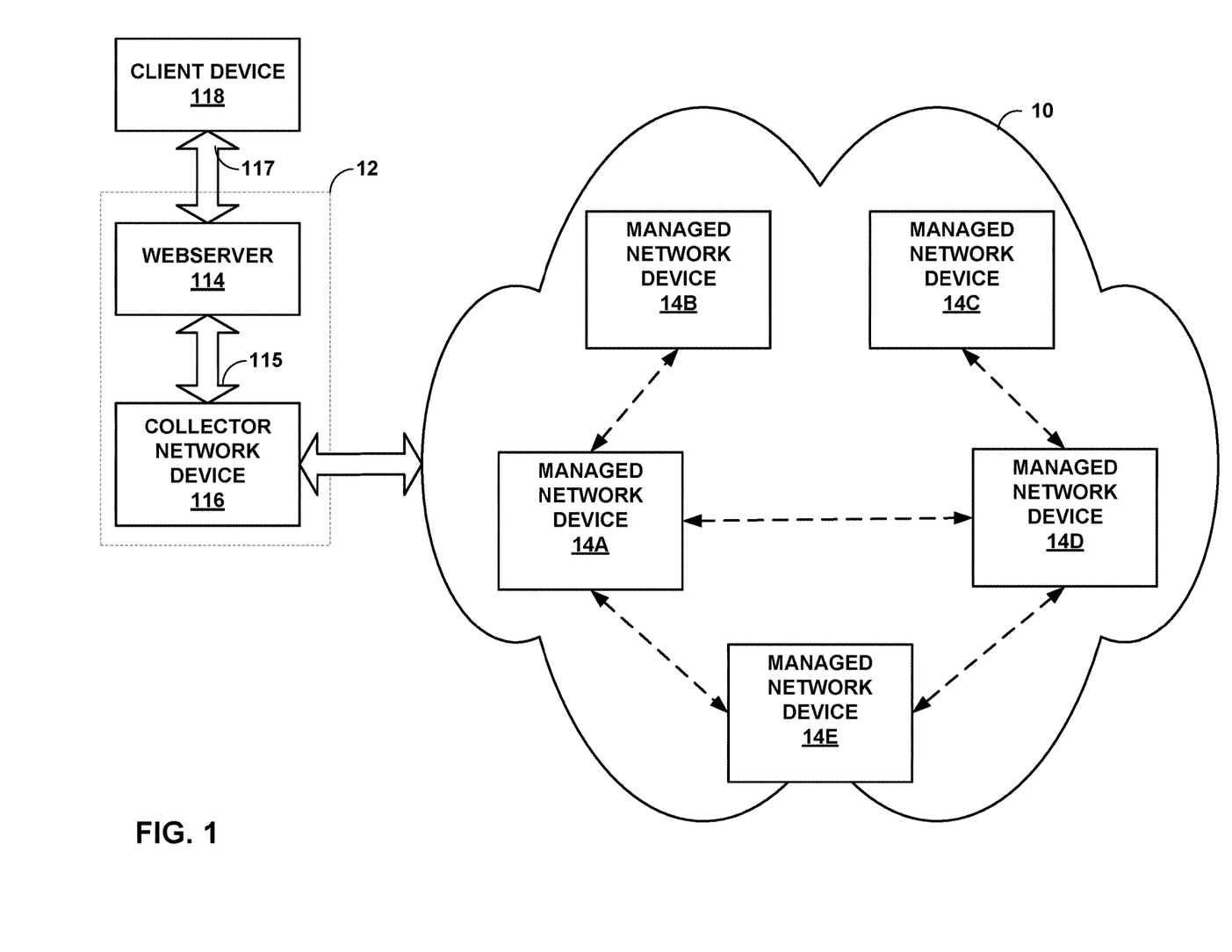
FIG. 1 is a block diagram illustrating another example system in which a network includes managed network devices managed by a distributed network management device, in accordance with data collection techniques of this disclosure.

FIG. 1 is a block diagram illustrating an example system in which a network 10 includes managed network devices 14A-14E (collectively, "managed network devices 14") managed by network management device 12. Network 10 includes managed network devices 14 that facilitate the access of content by client devices connected to network 10, where such client devices may include a personal computer, a laptop computer, a mobile telephone, a network telephone, a television set-top box, a video game system, a point-of-sale device, a personal digital assistant, an intermediate network device, a network appliance, or another type of device capable of interfacing with and communicating over network 10. Each managed network device 14 may comprise one or more of a router, a switch, a gateway, a hub, a firewall, an intrusion detection/prevention (IDP) device, and/or any other type of networking equipment or device that facilitates the transfer of data over network 10.

Network 10 enables transmission of content using one or more packet-based protocols, such as Transmission Control Protocol/Internet Protocol (TCP/IP). In this respect, network 10 may support the transmission of data via discrete data units, often referred to as "packets." As a result, network 10 may be referred to as a "packet-based" or "packet switched" network. While described in this disclosure as transmitting, conveying, or otherwise supporting packets, network 10 may transmit data according to any other discrete data unit defined by any other protocol, such as a cell defined by the Asynchronous Transfer Mode (ATM) protocol, or a datagram defined by the User Datagram Protocol (UDP).

Distributed network management device 12 manages one or more of managed network devices 14. Distributed network management device 12 may issue commands to monitor or control managed network devices 14, where such commands may conform to a syntax supported by a command line interface presented by each of managed network device 14. In operation, distributed network management device 12 issues a command to direct managed network device 14 to retrieve management data. The management data may include configuration and/or operational information. Managed network device 14 receives the command (which may also be referred to as a "request") to retrieve the management data, and then obtains the requested management data.

In some instances, the management data may include a large amount of management data that exceeds certain thresholds supported by an underlying messaging bus. That is, distributed network management device 12 may include, as shown in the example of FIG. 1, distributed network devices 114 and 116 that execute different functions associated with distributed network management device 12, but which exchange messages via a messaging bus 115.

Network device 114, which is denoted as a "webserver 114" in the example of FIG. 1, may represent a network device configured to present webservices to client device 118 that facilitate remote network management of managed network devices 14. Webserver 114 may present an Internet portal (or other type of webpage) with which a network administrator or other network operator may interact to issue commands that edit, delete, obtain, or otherwise change the underlying management data stored by managed network devices 14. Webserver 114 may present what may be referred to as frontend/user focused services of distributed network management device 12.

Network device 116, which is denoted as "collector network device 116" in the example of FIG. 1, may represent a network device configured to interface with managed network devices 14 via a remote command line interface (CLI) session to issue the command, which may be the same command received by the webpage or a translated version of the command received via the webpage that conforms to the CLI syntax. Collector network device 116 may issue the command requesting the management data stored by the managed network device 14, where such command may, as an example, comprise a "show config" command. The "show config" command may result in managed network device 14 returning all of the management data stored by any given one of the managed network devices 14, which may result in large amounts of management data returned to collector network device 116.

Collector network device 116 may establish and maintain a messaging bus 115 between webserver 114 and collector network device 116 by which messages may be sent over a messaging bus executed over the streaming connection. Messaging bus 115 may, for example, conform to the advanced message queuing protocol (AMQP) that supports so-called "microservices." That is, distributed network management system 12 may utilize a microservices architecture that structures the network management application as a collection of services that are loosely coupled, where each service may be independently deployed.

To facilitate the interaction of the services, which in the example of FIG. 1, is a web-based interface presented by webserver 114 and a backend management data collection service provided by the collector network device 116, distributed network management system 12 may establish and maintain messaging bus 115. However, while messaging bus 115 may facilitate rapid and ordered communication between webserver 114 and collector network device 116, messaging bus 115 may be better suited for small discrete messages that deliver fixed, smaller amounts of data between services.

Further, webserver 114 may establish and maintain a streaming connection 117 between webserver 114 and client device 118 that is suited for delivery of smaller amounts of data (common for microservices). Streaming connection 117 may, for example, include a JavaScript input-output (IO) socket ("IOsocket") configured to facilitate delivery of discrete amounts of data.

That is, AMQP messaging bus 115 may present certain requirements on message size due to queue sizes of infrastructure (e.g., network devices, such as AMQP compliant servers). Moreover, streaming connection 117 may have similar limitations to messaging bus 115 in terms of delivery of large amounts of data. In this respect, the various architectures supporting the microservices may overrun buffers used to store the message, resulting in dropped messages, latency, and/or other network issues.

In accordance with various aspects of the techniques described in this disclosure, webserver 114 may issue commands and/or queries that may retrieve more management data than may be supported via the underlying streaming and messaging architectures. In these instances in which the underlying streaming network architecture/messaging infrastructure is unable to accommodate streaming of large amounts of management data, collector network device 116 may divide the management data into discrete chunks, labeling each of the chunks with a transaction identifier and a chunk identifier. Collector network device 116 may then output each chunk separately via the streaming connection 115 configured between collector network device 116 and webserver 114, where client device 118 may use the transaction identifier and the chunk identifier from each chunk to reconstruct the management data.

In this respect, collector network device 116 may avoid overwhelming the underlying messaging bus 115, and thereby potentially prevent time outs, repeated retry requests (as the management data may not be successfully delivered in full in which case webserver 114 may issue the command again—which is referred to herein as a retry request), and the like. That is, by sending the management data as discrete chunks, the configured streaming connection 115 between collector network device 116 and webserver 114 may successfully deliver each chunk. Moreover, distributed network management system 12 can individually process each successive chunk and update the interface (e.g., an Internet portal or website) with the management data extracted from each chunk, thereby presenting a more responsive interface that allows the administrator or other user to remain more engaged with the Internet portal (which reduces frustration that may result in repeated retry requests when activity between distributed network management system 12 and managed network device 14A is not transparent).

In operation, webserver 114 may issue a command to request managed network device 14A retrieve management data stored by managed network device 14A. The command, as noted above, may conform to a syntax of a command line interface presented by managed network device 14A. The command may include a "show config" command that request that all configuration data (which is an example of management data) be returned to distributed network management system 12. Alternatively, the command may include a "ping" command to test network connectivity of all or some subset of managed network devices 14 relative to another device, such as distributed network management system 12.

In any event, managed network device 14A (or a large number of managed network devices 14, per the "ping" command) may obtain a large amount of management data as a result of the command, which is to be returned to distributed network management system 12. Such large amounts of management data may overwhelm message bus 115 (which may result in dropped data, latency that frustrates administrator resulting in retry request, etc.), but rather than attempt to send all of the management data via message bus 115, collector network device 116 may generate a plurality of partial responses as separate messages that each includes a different portion of the management data requested by the command.

In other words, collector network device 116 may receive, via message bus 115 and from webserver 114, the command requesting the management data stored by managed network device 14A (for example). Collector network device 116 may send the command (which may be the same as the received command or a different command, such as a translated version of the received command that conforms to the CLI syntax) to managed network device 14A that directs managed network device 14A to retrieve or otherwise output the management data. Responsive to sending the command, collector network device 116 may receive, from managed network device 14A, the management data.

Collector network device 116 may generate chunks that each includes a portion of the management data as a payload with a chunk header that includes a transaction identifier specifying a streamed connection session along with a chunk identifier that identifies a chunk of the streamed connection session relative to another chunk so as to facilitate recombining of the management data from the chunks. Collector network device 116 may then output, via message bus 115 and to webserver 114, the plurality of partial responses (which may also be referred to as chunks).

Webserver 114 may receive, via messaging bus 115, the partial responses from collector network device 116, wherein each of the partial responses is received as a separate message from collector network device 116 and includes a different portion of the management data requested by the command. Using the transaction identifier, webserver 114 may determine that each of the partial responses corresponds to the same transaction associated with the command and identify that such transaction occurs between webserver 114 and client device 118 (as webserver 114 may host a number of different sessions with multiple different client devices 118 and the transaction identifier may be used to identify which session to relay the chunks). Webserver 114 may send, via streaming connection 117 and to client device 118, each of the different portions of the management data for presentation at client device 118. Client device 118 may then recombine, based on the chunk identifier, the partial responses received from distributed network management system 12 into the management data requested by the command.

In some instances, client device 118 may receive only a subset (which is to be understood to be a value greater than zero and does not refer to the traditional mathematical notion of a "subset" that may include an empty subset unless otherwise specified) of the partial responses. Client device 118 may not refrain from combining the subset of partial responses but may combine the subset of partial responses to reconstruct a partial subset of the management data. Client device 118 may present the partial subset of reconstructed management data via the Internet portal (e.g., a management website) such that the administrator or other user may view the partial subset of management data without experiencing much if any delay. Client device 118 may continue to combine any additional partial responses to formulate revised or, in other words, updated subsets of the management data, presenting the updated subset of management data. Client device 118 may continue in this manner to combine the partial responses until all of the management data has been reconstructed and presented.

As such, collector network device 116 may avoid overwhelming underlying messaging bus 115, and thereby potentially prevent time outs, repeated retry requests (as the management data may not be successfully delivered in full in which case distributed network management system 12 may issue a retry request), and the like. That is, by sending individual chunks, configured messaging bus 115 between collector network device 116 and webserver 114 may successfully deliver each chunk. Further, webserver 114 may relay each separate chunk via streaming connection 117 to client device 118 without overwhelming the underlying IO socket infrastructure (which is an example of streaming infrastructure). Moreover, client device 118 can individually process each successive chunk and update the interface (e.g., an Internet portal or website) with the management data extracted from each chunk, thereby presenting a more responsive interface that allows the administrator or other user to remain more engaged with the Internet portal (which reduces frustration that may result in repeated retry requests when activity between NMS 12 and managed network device 14 is not transparent).

Figure 2A:
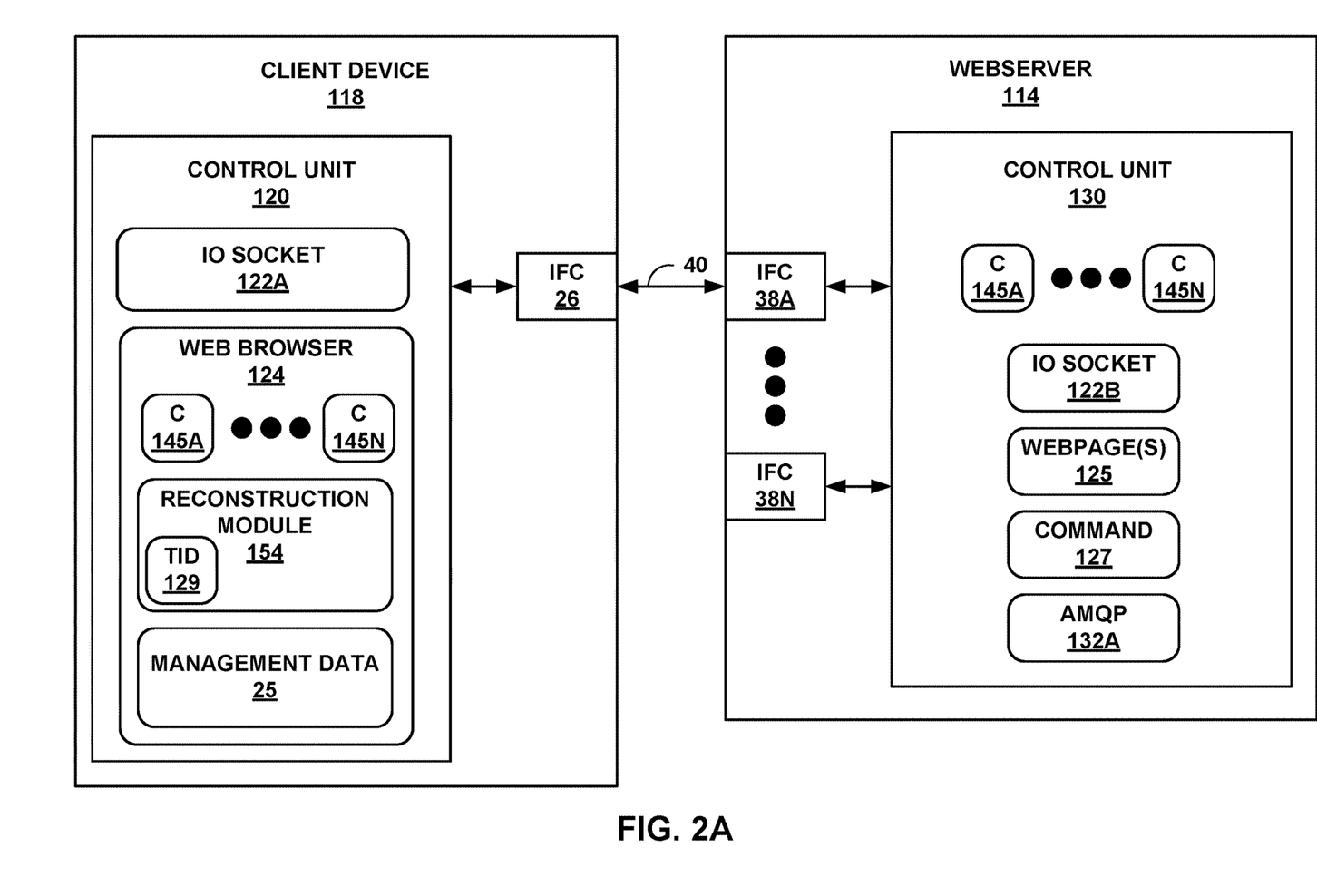
FIGS. 2A and 2B are block diagrams illustrating examples of various devices of FIG. 1 in more detail.
Figure 2B:
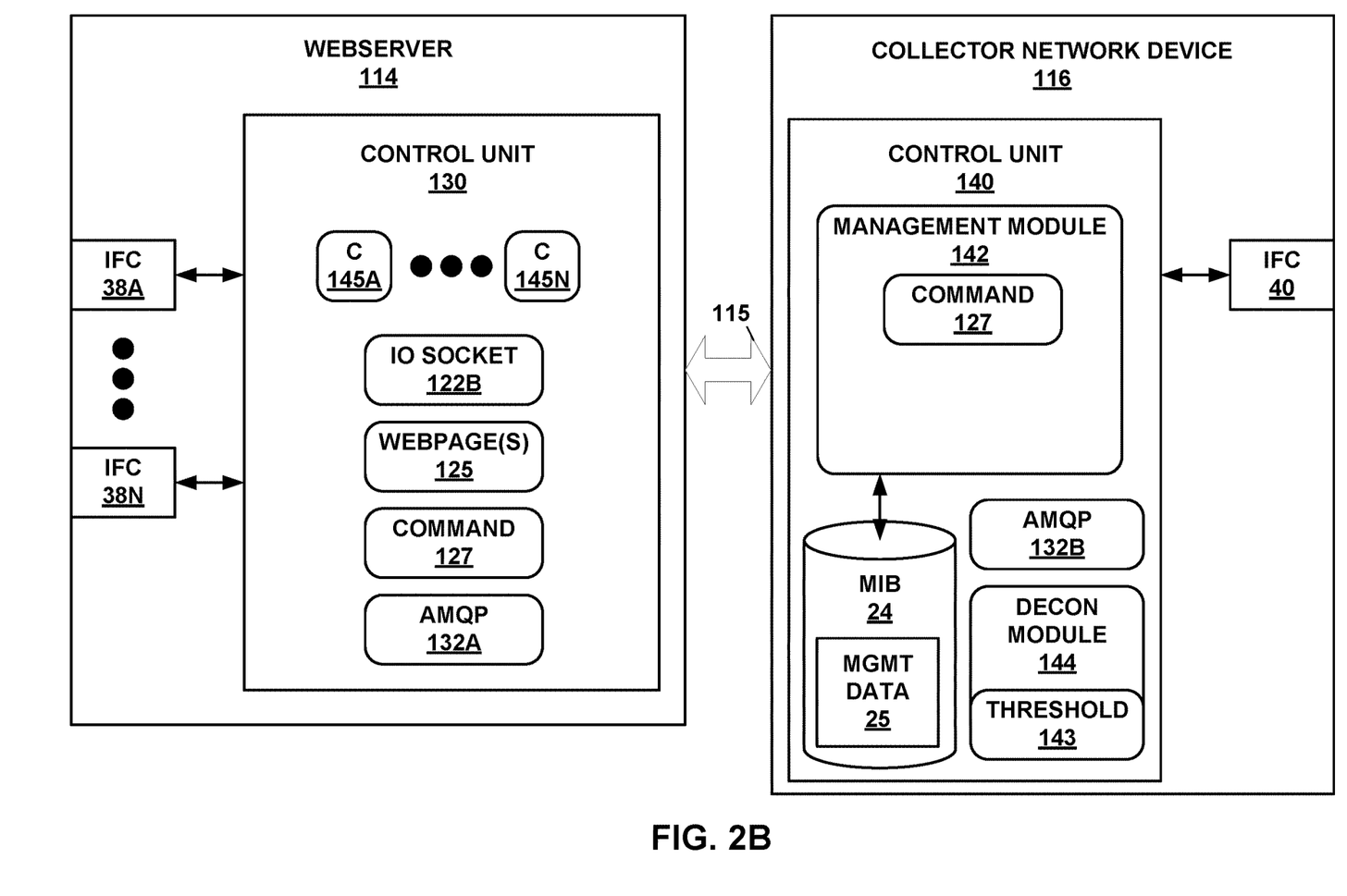

FIGS. 2A and 2B are block diagrams illustrating examples of various devices of FIG. 1 in more detail. In the example of FIG. 2A, client device 118 is coupled to webserver 114 via network elements 40. Network elements 40 represent communication devices and elements (e.g., switches, routers, links) of a larger network (e.g., network 10 of FIGS. 1A and 1B) that may comprise any type of network capable of transmitting data, such as a layer three (L3) packet-switched network (e.g., the Internet) operating over one or more layer two (L2) networks (e.g., an Ethernet or multi-packet label switching (MPLS) network). Reference to layers in this disclosure should be construed as reference to layers of the Open Systems Interconnection (OSI) reference model, or OSI model for short. The network may include a wide variety of interconnected computing devices or nodes, such as web servers, print servers, application servers, data servers, workstations, desktop computers, laptop computers, cellular or other mobile devices, Personal Digital Assistants (PDAs), and any other device capable of connecting to a computer network via a wireless and/or wired connection.

As shown in the example FIG. 2A, client device 118 includes control unit 120 and interface card ("IFC") 26, while webserver 114 includes control unit 130 and interface cards 38A-38N (collectively, "IFCs 38"). Control units 120 and 130 may each include one or more processors (not shown in FIG. 2A) that execute software instructions, such as those used to define a software or computer program, stored to a computer-readable storage medium (again, not shown in FIG. 2A). Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control units 16 and 30 may each comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 120 provides an operating environment for IO socket 122A and web browser 124. Control unit 120 may execute IO socket 122A to establish streaming connection 117 over network elements 40 with webserver 114, where control unit 130 may likewise execute IO socket 122B to establish streaming connection 117.

Once streaming connection 117 is established, a user may interface with client device 118 to direct web browser 124 to access webserver 114 by which to retrieve one or more webpages 125. Via web browser 124, the user may issue a command 127 requesting management data stored by one or more of managed network devices 14. Via IO socket 122B, control unit 130 may receive command 127 and respond to command 127 with a transaction identifier 129 ("TID 129") that uniquely identifies the transaction established by issuing command 127.

Control unit 130 may next generate a message that conforms to AMQP. That is, control unit 130 may host webpages 125 and deliver webpages 125 via IO socket 122B. Control unit 130 may also receive command 127 via IO socket 122B, where control unit 130 also invokes AMQP module 132A ("AMQP 132A") to establish a messaging bus 115 with collector network device 116. AMQP module 132A may interface with collector network device 116 to establish messaging bus 115 in accordance with AMQP, where AMQP module 132A may format command 127 as a message (that conforms to AMQP) for delivery to collector network device 115 via messaging bus 115.

Referring next to the example of FIG. 2B, webserver 114 is shown coupling to collector network device 116 via messaging bus 115 established in accordance with AMQP. Collector network device 116 includes an interface card 40 ("IFC 40") and a control unit 140. IFC 40 may be similar to IFCs 38, while control unit 140 may be similar to control units 120 and 130.

Control unit 140 may be configured to execute a management module 142 that facilitates interactions with managed network devices 14, e.g., managed network device 14A. Control unit 140 may also be configured to execute AMQP module 132B ("AMQP 132B") to establish messaging bus 115, where AMQP module 132B may be similar if not substantially similar to AMQP module 132A.

Control unit 140 may receive a message via messaging bus 115 and invoke AMQP module 132B to process the message, thereby parsing command 127 from the message. Control unit 140 may invoke management module 142 to process command 127 and then interface with managed network device 14A (e.g., via the above noted CLI) to direct the managed network device to output management data 25. Responsive to issuing command 127 (either in original form or in a translated form as discussed above), control unit 140 may receive management data 25, which control unit 140 may store to a management information base (MIB) 24.

Rather than transmit management data 25 (which may include 10s, 100s, 1000s, or more lines of text) in a single message, control unit 140 may invoke deconstruction module 144 ("decon module 144"), which may represent a module configured to perform various aspects of the techniques to deconstruct management data 25 into the above noted chunks. Deconstruction module 144 may generate chunks 145A-145N (which is another way of referring to partial responses, and which are shown as "C 145A" . . . "C 145N" in the example of FIG. 2B) that include transaction identifier 129, which may have been provided in the message from webserver 114 that included command 127, along with a chunk identifier. The chunk identifier may refer to a monotonically increasing number assigned to each one of chunks 145A-145N ("chunks 145") that uniquely identifies each chunk associated with transaction identifier 129.

To generate chunks 145, deconstruction module 144 may divide management data 25 by a threshold 143. For example, assuming management data 25 is 1000 lines of text and threshold 143 is set to 200 lines of text, deconstruction module 144 may generate 5 chunks (represented by chunks 145 in the example of FIG. 2B. A network administrator or other operator may configure threshold 143, threshold 143 may be automatically determined based on current conditions of messaging bus 115, threshold 143 may be statically set, or some combination of the foregoing. In any event, deconstruction module 144 may output chunks 145.

Responsive to outputting chunks 145, control unit 140 may invoke AMQP module 132B to formulate chunks 145 as discrete messages that conform to, in this example, AMQP. Although described with respect to AMQP, various other messaging protocols may be employed, such as Message Queuing Telemetry Transport (MQTT). AMQP module 132B may then output chunks 145 (as discrete messages) via messaging bus 115.

Responsive to receiving chunks 145 via messaging bus 115, control unit 130 process each of chunks 145 to determine which IO socket (as there may be a number of different sessions between client device 118 or other client devices 118) is associated with each one of chunks 145. As such, control unit 130 may associate chunks 145 with IO socket 122B, thereby invoking IO socket 122B to deliver chunks 145 to client device 118 via streaming connection 117.

Referring back to the example of FIG. 2A, client device 118 may receive chunks 145 via streaming connection 117. Responsive to receiving chunks 145 via streaming connection 145, control unit 120 may invoke IO socket 122A to parse chunks 145, whereupon control unit 120 invokes web browser 124 to process chunks 145. Web browser 124 may be configured to process chunks 145 by way of reconstruction unit 154.

Reconstruction module 154 may represent a module configured to process chunks 145 to reconstruct management data 25. Control unit 120 may pass transaction identifier 129 returned by webserver 114 responsive to receiving command 127 to reconstruction module 154 such that reconstruction module 154 may identify chunks 145 that are associated with a given transaction (or in other words command 127). Reconstruction unit 154 may compare transaction identifier 129 to the transaction identifier specified in each of chunks 145, sorting chunks 145 associated with transaction identifier 129 from those of chunks 145 associated with a different transaction identifier. Reconstruction module 154 may then reorder chunks 145 based on the chunk identifier specified in each of chunks 145 to reconstruct management data 25.

In some examples, web browser 124 may invoke reconstruction module 154 to process only a subset of chunks 145 (e.g., chunks 145A and 145B). Reconstruction module 154 may reconstruction, from chunks 145A and 145B, a subset of management data 25, which web browser 124 may output prior to receiving all of chunks 145, thereby potentially improving the user experience (in terms of reduced latency) in reviewing management data 25 (or a portion thereof in this instance).

Figure 3:
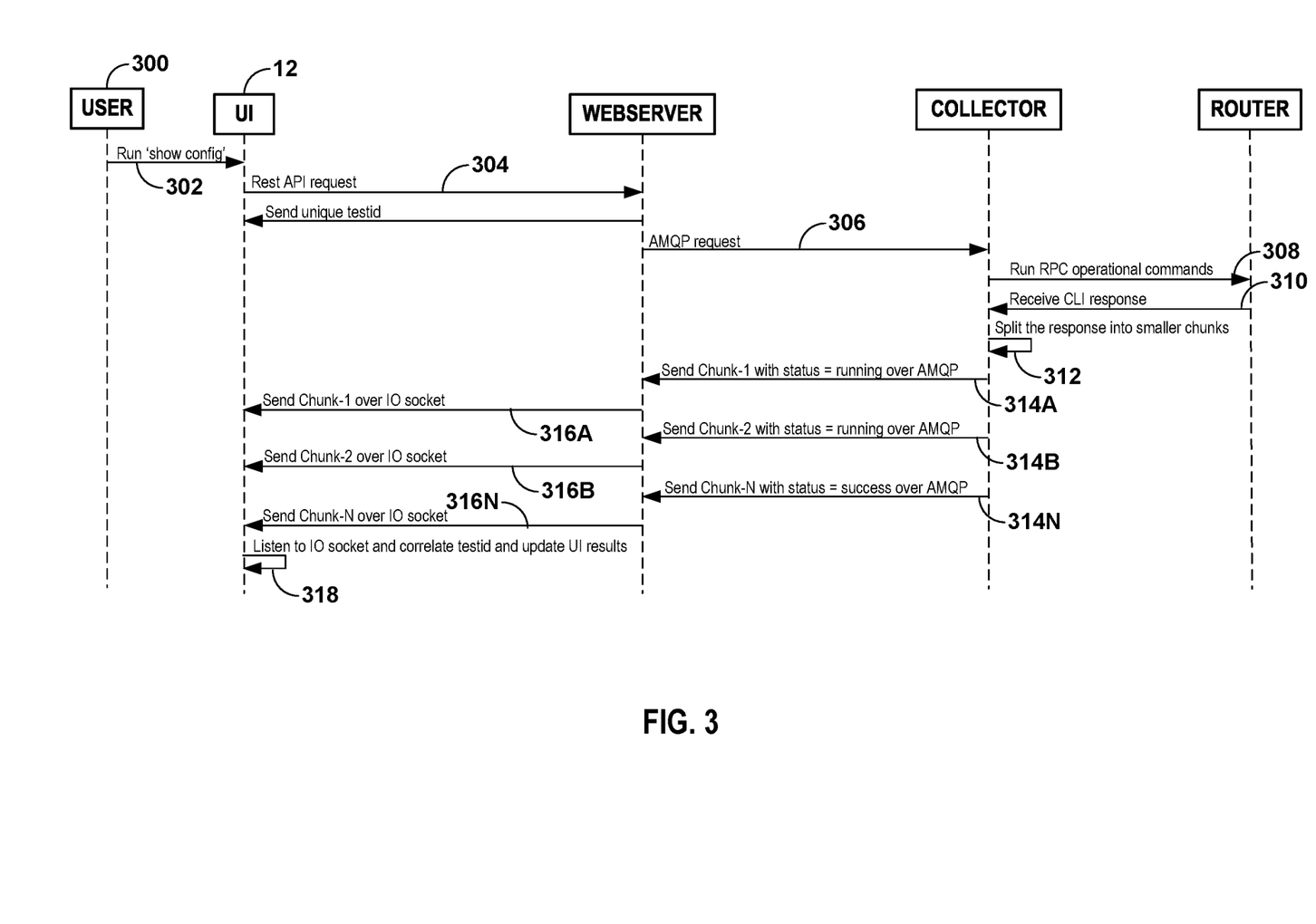
FIG. 3 is a flowchart illustrating example operation of the management system shown in the example of FIG. 2 in performing various aspects of the data collection techniques of this disclosure.

FIG. 3 is a flowchart illustrating example operation of the management system shown in the example of FIG. 2 in performing various aspects of the data collection techniques. Initially, a user may interface with admin interface 22 to enter a command, which in this example is a "show config" command (302). As noted above, NMS 12 may present admin interface 22 via an Internet portal, whereby the user (e.g., user 300) may enter the "show config" command.

Responsive to receiving the command, NMS 12 (represented by "UI," which refers to the user interface, in the example of FIG. 3) may issue an application programming interface (API) request to a dedicated webserver that supports the underlying messaging bus (304). NMS 12 may establish an IO socket between NMS 12 and the webserver (which NMS 12 may host in some examples). In any event, the webserver may issue a message via the AMQP protocol that includes the "show config" request, where such message may be denoted an AMQP request (306). A collector, in some examples, may process the AMQP request and execute a remote procedural call (RPC) operational command to management agent 32, which may represent an example of a command line interface (CLI) (308).

The collector may be a dedicated network management intermediate device (which is not shown in the example of FIG. 2) or may be executed by managed network device 14A, e.g., as part of management agent 32. In either event, management agent 32 may process the RPC operational command, which in this example represents a "show config" command. Management agent 32 may access MIB 36 to retrieve management data 25 and provide the management data to the collector (and as such the collector receives the CLI response—310).

Assuming the collector is part of management agent 32, deconstruction module 34 may process management data 25 to determine whether management data 25 exceeds a threshold. When the management data 25 does not exceed the threshold, management agent 32 may output, via the messaging bus, the management data 25 as a single message messaging bus that conforms with AMQP. When the management data 25 exceeds the threshold, management agent 32 may split management data 25 into multiple smaller chunks that each includes a portion of management data 25 (312). Each of the chunks may represent a different message that conforms to the AMQP protocol, where each chunk includes the transaction identifier and the chunk identifier. Management agent 32 may transmit each chunk (e.g., Chunk-1, Chunk-2, . . . , Chunk-N) (314A-314N) where the last chunk (Chunk-N) includes a status indicating successful transmission via AMQP, and each preceding chunk (e.g., Chunk-1, Chunk-2, etc.) includes a status indicating that additional chunks are still "running over AMQP"). In the instance where the router fails to collect data from the collector, the collector may only send Chunk-1 with status equals "error," where "error" may represent a detailed error message, such as "access failed."

The webserver may receive each chunk and relay the chunks over the IO socket to NMS 12 (316A-316N). NMS 12 may invoke reconstruction module 20 to process each chunk, correlating each chunk based on the transaction identifier (318), which may also be referred to as a "test identifier" or "testid," to avoid associating chunks together from different responses to different commands/requests. Once correlated, reconstruction module 20 may order the chunks according to the chunk identifier before parsing the portion of management data 25 from each chunk. Reconstruction module 20 may output each portion of management data 25, which admin interface 22 may process and update the user interface output to the user. This process may continue in this manner until management data 25 is fully reconstructed and output to the user.

In this respect, the collector splits result text (which is an example of management data 25) into smaller chunks with fixed lines/size (e.g., 500 lines) and transport each chunk seamlessly with unique transaction identifier and chunk identifier. For example, if the response text includes 100,000 lines, then the collector splits the response text into smaller chunks of size 500 lines (or any threshold amount of lines) such that 200 chunks are generated (as 100,000 divided by 500 equals 200 chunks), resulting in chunk-1, chunk-2, . . . , chunk-200). The collector then sends the chunks over AMQP (as distinct AMQP messages) with a unique chunk identifier and status (e.g., first 199 chunks with status equal to "running" and the last chunk-200 with a status set equal to "successful"). In this way, UI/consumers get responses faster and no memory load on infrastructure like the AMQP/IO socket and other consumer daemons/microservices like Webserver.

Figure 4:
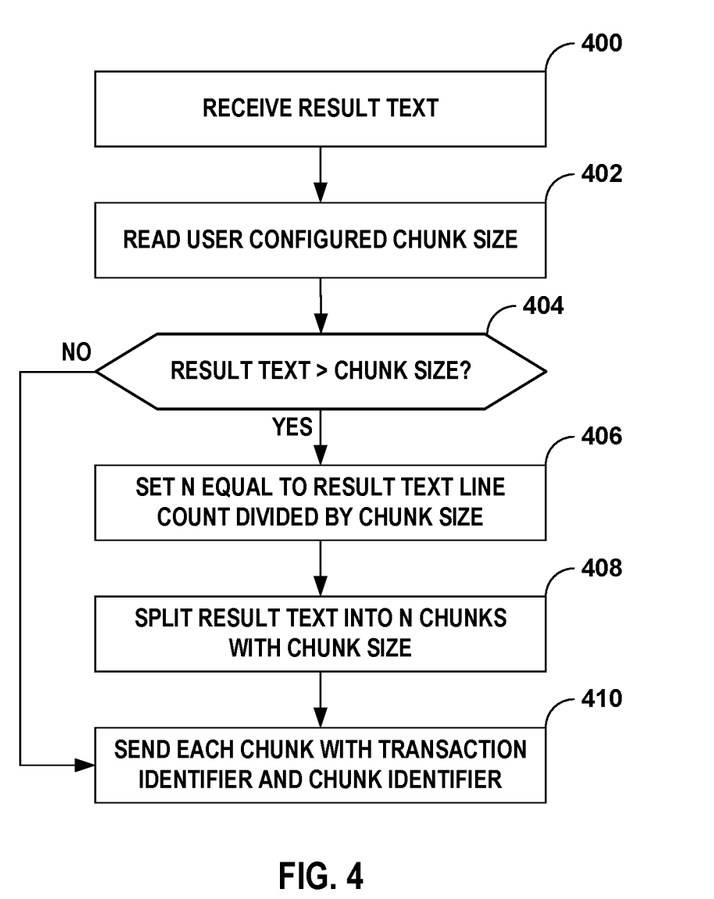
FIG. 4 is a flowchart illustrating example operation of a collector in performing various aspects of the data collection techniques of this disclosure.

FIG. 4 is a flowchart illustrating example operation of a collector in performing various aspects of the data collection techniques. For purposes of illustration, it is assumed that the collector is part of management agent 32 executed by managed network device 14A shown in the example of FIG. 2. While described with respect to management agent 32, the collector may be a separate network device, part of the webserver, or any other type of management device capable of communicating with the webserver via a messaging bus.

In any event, management agent 32 may initially receive management data 25 as result text (400) responsive to processing a command issued via the messaging bus from NMS 12. Management agent 32 may obtain a user defined chunk size (which may be defined by a user via admin interface 22 presented by NMS 12) (402). Management interface 32 may invoke deconstruction module 34, which may compare the number of lines to the user defined chunk size (which may represent an example of the above noted threshold) (404).

When the result text size (as defined in this example by a number of lines) is greater than the chunk size ("YES" 404), deconstruction module 34 may set N (which denotes a number of chunks) equal to the result text line count divided by the chunk size (which in this example defines a threshold number of lines of text) (406). Deconstruction module 34 may next split the result text into N chunks, each of which have up to the chunk size (408), and send each chunk with the above noted transaction identifier and the corresponding chunk identifier as a message via the AMQP messaging bus (410). When the result text has a number of lines less than the chunk size ("NO" 404), deconstruction module 34 may output a single chunk that includes the entirety of the result text in the payload (410).

Example chunks (which may conform to a JavaScript Object Notation—JSON—format) that deconstruction module 34 may produce are shown below:

```
{ "nodeid": 10,
   "testid": 1,
     "chunkid": 1,
     "result": "check-1... ",
     "status": "running",
     "error": null
```

-continued

```
    }
    ...
    { "nodeid": 10,
        "testid": 1,
            "chunkid": N,
            "result": "check-N... ",
            "status": "successful",
            "error": null
    }
```

In the examples above, the node identifier ("nodeid") may identify managed network device 14A, while the transaction identifier (denoted as "testid") may identify which chunks conform to a given result text, and chunk identifier ("chunked") may represent a unique identifier for each transaction identifier. Moreover, each chunk includes a payload shown as "result" along with a status "running" or "successful" where "running" indicates that additional chunks are being delivered and "successful" indicates that all chunks have been delivered. The chunk may also include a "error" field to identify whether any chunks have been returned with an error.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

The foregoing aspects of the techniques described above may enable the following examples:

Example 1A. A method comprising: receiving, by a collector network device and via a messaging bus configured between a webserver and the collector network device, a first command to request management data stored by a managed network device; sending, by the collector network device in response to the first command, a second command to direct the managed network device to output the management data; receiving, by the collector network device and from the managed network device, the management data; generate, by the collector network device and from the management data, a plurality of partial responses that each includes a different portion of the management data; and sending, by the collector network device and via the messaging bus to the webserver, each of the plurality of partial responses as a separate message.

Example 2A. The method of example 1A, wherein the management data comprises at least one of configuration variables and operational variables.

Example 3A. The method of any combination of examples 1A and 2A, wherein each message includes a chunk that include a portion of the management data as a payload and a chunk header that includes a transaction identifier, and a chunk identifier.

Example 4A. The method of example 3A, wherein the portion of the management data includes a threshold portion of the management data that is less than a threshold amount of the management data.

Example 5A. The method of any combination of examples 1A-4A, wherein the messaging bus conforms to an advanced message queuing protocol (AMPQ).

Example 6A. The method of any combination of examples 1A-5A, wherein each of the portions of the management data includes a threshold portion of the management data that is less than a threshold amount of the management data.

Example 7A. The method of example 6A, wherein the threshold amount of the management data is configured by an administrator.

Example 8A. A collector network device comprising: an interface configured to: receive, via a messaging bus between the network management system and a webserver, a first command to request management data stored by a managed network device; send, in response to the first command, a second command to direct the managed network device to output the management data; receive, from the managed network device, the management data; and one or more processors configured to generate, from the management data, a plurality of partial responses that each includes a portion of the management data, wherein the interface is further configured to send, via the messaging bus and to the web server, each of the plurality of partial responses as a separate message.

Example 9A. The collector network device of example 8A, wherein the management data comprises at least one of configuration variables and operational variables.

Example 10A. The collector network device of any combination of examples 8A and 9A, wherein each message includes a chunk that include a portion of the management data as a payload and a chunk header that includes a transaction identifier, and a chunk identifier.

Example 11A. The collector network device of example 10A, wherein the portion of the management data includes a threshold portion of the management data that is less than a threshold amount of the management data.

Example 12A. The collector network device of any combination of examples 8A-11A, wherein the messaging bus conforms to an advanced message queuing protocol (AMPQ).

Example 13A. The collector network device of any combination of examples 8A-12A, wherein each of the portions of the management data includes a threshold portion of the management data that is less than a threshold amount of the management data.

Example 14A. The collector network device of example 13A, wherein the threshold amount of the management data is configured by an administrator.

Example 15A. A non-transitory computer-readable storage medium having instructions stored thereon that, when executed, cause one or more processors to: receive, via a messaging bus between a collector network device and a webserver, a first command to request management data stored by a managed network device; send, in response to the first command, a second command to direct the managed network device to output the management data; receive, from the managed network device, the management data; generate, from the management data, a plurality of partial responses that each includes a portion of the management data; and send, via the messaging bus and to the webserver, each of the plurality of partial responses as a separate message.

Example 1B. A method comprising: issuing, by a webserver, to a collector network device and via a message bus configured between the webserver and the collector network device, a command to request management data stored by a managed network device; receiving, by the webserver, from the collector network device via the message bus, and responsive to issuing the command, a plurality of partial responses from the collector network device, wherein each of the plurality of partial responses is received as a separate message from the collector network device and includes a different portion of the management data requested by the command; and sending, by the webserver, to a client device, and via a streaming connection between the webserver and the client device, each of the different portions of the management data for presentation at the client device.

Example 2B. The method of example 1B, wherein the management data comprises at least one of configuration variables and operational variables.

Example 3B. The method of any combination of examples 1B and 2B, wherein the plurality of partial responses each includes a chunk that include a portion of the management data as a payload and a chunk header that includes a transaction identifier, and a chunk identifier, and wherein sending each of the different portions of the management data comprises sending, to the client device and based on the transaction identifier and the chunk identifier, the chunks.

Example 4B. The method of example 3B, wherein the portion of the management data includes a threshold portion of the management data that is less than a threshold amount of the management data.

Example 5B. The method of example 3B, wherein sending each of the different portions comprises: reordering, based on the chunk identifier, each of the chunks having the same transaction identifier; and sending, to the client device, the reordered chunks such that the chunks having the same transaction identifier are sent individually according to the chunk identifier such that each of the chunks having the same transaction identifier are presented prior to receiving all of the chunks having the same transaction identifier.

Example 6B. The method of any combination of examples 1B-5B, wherein the streaming connection comprises an input-output (IO) socket.

Example 7B. The method of any combination of examples 1B-6B, wherein the messaging bus conforms to an advanced message queuing protocol (AMPQ).

Example 8B. The method of any combination of examples 1B-7B, wherein sending each of the different portions of the management data comprises sending each of the different portions of the management data for presentation via a webpage.

Example 9B. The method of any combination of examples 1B-8B, further comprising sending a webpage to facilitate entry of the command by which to request the management data.

Example 10B. The method of any combination of examples 1B-9B, further comprising: presenting a webpage by which to receive the command from the client device; and sending, responsive to receiving the command and to the client device via the streaming connection, a transaction identifier to enable the client device to associate each of the different portions of the management data.

Example 11B. A webserver comprising: one or more processors configured to: issue, via a message bus between a collector network device and the webserver, a command to request management data stored by a managed network device; receive, via the message bus and responsive to issuing the command, a plurality of partial responses from the collector network device, wherein each of the plurality of partial responses is received as a separate message from the collector network device and includes a different portion of the management data requested by the command; and send, to a client device and via a streaming connection between the webserver and the client device, each of the different portions of the management data for presentation at the client device; and a memory configured to store the different portions of the management data.

Example 12B. The webserver of example 11B, wherein the management data comprises at least one of configuration variables and operational variables.

Example 13B. The webserver of any combination of examples 11B and 12B, wherein the plurality of partial responses each includes a chunk that include a portion of the management data as a payload and a chunk header that includes a transaction identifier, and a chunk identifier, and wherein the one or more processors are configured to send, to the client device and based on the transaction identifier and the chunk identifier, the chunks.

Example 14B. The webserver of example 13B, wherein the portion of the management data includes a threshold portion of the management data that is less than a threshold amount of the management data.

Example 15B. The webserver of example 13B, wherein the one or more processors are configured to: reorder, based on the chunk identifier, each of the chunks having the same transaction identifier; and send, to the client device, the reordered chunks such that the chunks having the same transaction identifier are sent individually according to the chunk identifier such that each of the chunks having the same transaction identifier are presented prior to receiving all of the chunks having the same transaction identifier.

Example 16B. The webserver of any combination of examples 11B-15B, wherein the streaming connection comprises an input-output (IO) socket.

Example 17B. The webserver of any combination of examples 11B-16B, wherein the messaging bus conforms to an advanced message queuing protocol (AMPQ).

Example 18B. The webserver of any combination of examples 11B-17B, wherein the one or more processors are configured to send each of the different portions of the management data for presentation via a webpage.

Example 19B. The webserver of any combination of examples 11B-18B, wherein the one or more processors are further configured to send a webpage to facilitate entry of the command by which to request the management data.

Example 20B. The webserver of any combination of examples 11B-19B, wherein the one or more processors are further configured to: send a webpage by which to receive the command from the client device; and send, responsive to receiving the command and to the client device via the streaming connection, a transaction identifier to enable the client device to associate each of the different portions of the management data.

Example 21B. A non-transitory computer-readable storage medium having instructions stored thereon that, when executed, cause one or more processors of a webserver to: issue, via a message bus between a collector network device and the webserver, a command to request management data stored by a managed network device; receive, via the message bus and responsive to issuing the command, a plurality of partial responses from the collector network device, wherein each of the plurality of partial responses is received as a separate message from the collector network device and includes a different portion of the management data requested by the command; and send, to a client device and via a streaming connection between the webserver and the client device, each of the different portions of the management data for presentation at the client device.

The invention claimed is:

1. A method comprising:
receiving, by a collector network device forming part of a distributed network management system that manages a managed network device and via a messaging bus configured between a webserver forming part of the distributed network management system and the collector network device, a first command to request management data stored by the managed network device, the management data comprising at least one of configuration variables and operational variables, the messaging bus conforming to a layer seven protocol and configured to support microservices in the form of the collector network device and the web server;
sending, by the collector network device in response to the first command, a second command to direct the managed network device to output the management data;
receiving, by the collector network device and from the managed network device, the management data;
generating, by the collector network device and from the management data, a plurality of partial responses that conform to the layer seven protocol and that each includes a different portion of the management data so as to accommodate limited buffer sizes supported by the microservices, wherein the plurality of partial responses each includes a chunk that includes the portion of the management data as a payload and a chunk header that includes a transaction identifier, and a chunk identifier, and wherein each of the portions of the management data includes a threshold portion of the management data that is less than a threshold amount of the management data; and
sending, by the collector network device and via the messaging bus to the webserver, each of the plurality of partial responses as a separate message;
reordering, by the webserver, the chunks having the same transaction identifier according to the chunk identifier such that each of the chunks having the same transaction identifier are presented prior to receiving all of the chunks having the same transaction identifier; and
sending, by the webserver, to a client device, and via a streaming connection between the webserver and the client device, the reordered chunks such that the chunks having the same transaction identifier are sent individually according to the chunk identifier such that each of the chunks having the same transaction identifier are presented prior to receiving all of the chunks having the same transaction identifier.

2. The method of claim 1, wherein the messaging bus conforms to an advanced message queuing protocol (AMQP).

3. The method of claim 1, wherein the threshold amount of the management data is configured by an administrator.

4. A computing system comprising:
a webserver configured to issue, via a messaging bus between a collector network device forming part of a distributed network management system that manages a managed network device and the webserver forming part of the distributed network management system, a first command to request management data stored by a managed network device, the messaging bus conforming to a layer seven protocol and configured to support microservices in the form of the collector network device and the webserver; and
the collector network device configured to:
receive, via the messaging bus, the first command;
send, in response to the first command, a second command to direct the managed network device to output the management data;
receive, from the managed network device, the management data; and
generate, from the management data, a plurality of partial responses that conform to the layer seven protocol and that each includes a portion of the management data so as to accommodate limited buffer sizes supported by the microservices, wherein the plurality of partial responses each includes a chunk that includes the portion of the management data as a payload and a chunk header that includes a transaction identifier, and a chunk identifier;
send, via the messaging bus and to the webserver, each of the plurality of partial responses as a separate message, and wherein the web server is further configured to:

receive, via the messaging bus and responsive to issuing the command, the plurality of partial responses from the collector network device, wherein each of the plurality of partial responses is received as a separate message from the collector network device and includes a different portion of the management data requested by the command;

reorder, based on the chunk identifier, each of the chunks having the same transaction identifier; and send, to a client device and via a streaming connection between the webserver and the client device, the reordered chunks such that the chunks having the same transaction identifier are sent individually according to the chunk identifier such that each of the chunks having the same transaction identifier are presented prior to receiving all of the chunks having the same transaction identifier.

5. The computing system of claim 4, wherein the management data comprises at least one of configuration variables and operational variables.

6. The computing system of claim 4, wherein the portion of the management data includes a threshold portion of the management data that is less than a threshold amount of the management data.

7. The computing system of claim 6, wherein the threshold amount of the management data is configured by an administrator.

8. The computing system of claim 4, wherein the streaming connection comprises an input-output (IO) socket, and wherein the messaging bus conforms to an advanced message queuing protocol (AMQP).

* * * * *